Patented Nov. 8, 1949

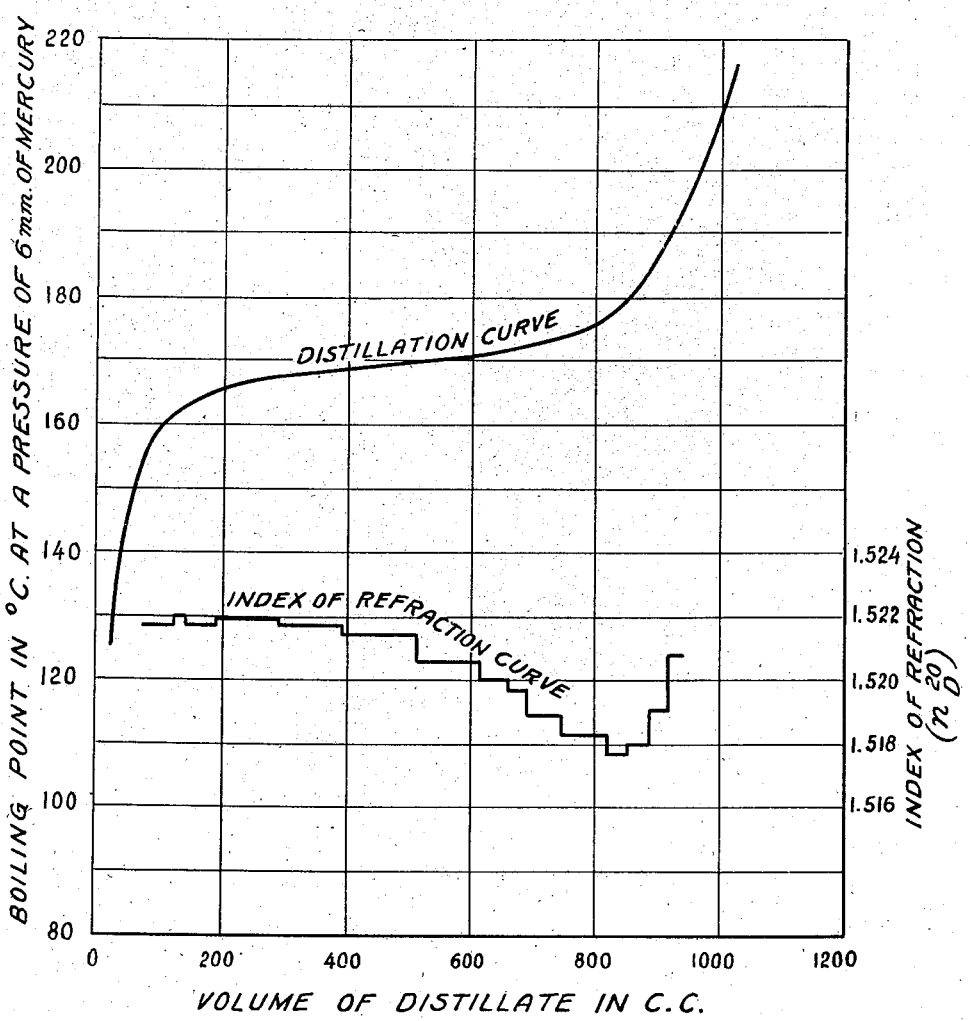
GEORGE C. JOHNSON
AND JOHN KELLETT, III
INVENTORS

2,487,338

UNITED STATES PATENT OFFICE 2,487,338

CONDENSATION OF AROMATIC HYDROCARBONS WITH TERPENES

George C. Johnson and John Kellett, III, Woodbury, N. J., assignors to Socony-Vacuum Oil Company, Incorporated, a corporation of New York Application April 2, 1946, Serial No. 659,026

10 Claims. (Cl. 260—668)

1

This invention relates to the alkylation of aromatic hydrocarbons with terpenes, and is more particularly concerned with a process for effecting the alkylation of aromatic hydrocarbons with terpenes, and with the products thus obtained.

It is well known in the art to effect a union between molecules of aromatic hydrocarbons and various radicals to produce a variety of materials called alkylates which represent structurally the addition of the original aromatic hydrocarbon molecule and of the radical supplied during the reaction. The operation is called alkylation and the conditions of temperature, pressure, etc., are called alkylating conditions. The radical may be supplied by a variety of compounds such as olefinic hydrocarbons, alcohols, alkyl halides, etc., which accordingly are called alkylating agents.

The alkylation operation may be carried out in the absence or presence of substances that promote the alkylation reaction. These substances are referred to as alkylation catalysts and the operations involving the use of such substances are known as catalytic alkylations, as distinguished from operations wherein no alkylation catalysts are employed, and which are referred to in the art as thermal alkylations.

Numerous materials have been used as alkylation catalysts in the alkylation of aromatic hydrocarbons. Sulfuric acid, phosphoric acid, natural and synthetic clays, hydrofluoric acid, and aluminum chloride may be mentioned as examples of well known alkylation catalysts.

As is well known to those familiar with the art, solid resins have been obtained by treating a mixture of pinene (a terpene) and toluene with aluminum chloride. The proponent of this process (U. S. Patent No. 1,939,932) believed that the resins thus obtained were the product of a reaction between the toluene and the pinene. In other words, he believed that an alkylation reaction occurred in that there was aromatic entry into the pinene molecule.

Later investigators familiar with the experimental background of this process have duplicated the work [Jl. Am. Chem. Soc. 59, 1312 (1937)], and have conclusively shown that when mixtures of a terpene, pinene, for example, and an alkyl benzene, toluene, for example, are treated with aluminum chloride, there is no aromatic entry, that the resinous product is the product of terpene polymerization, and that the role of the aromatic hydrocarbon is that of a solvent. They have shown that at the end of the reaction, the aromatic hydrocarbon can be recovered substantially completely. Accordingly, these later investigators concluded that when a mixture of terpenes and an alkyl benzene is treated with aluminum chloride, the resinous products are terpene polymers and that the polymerization "takes place without interreaction of aromatic and terpene," and further, that "it would be unusual if aromatic entry could be accomplished."

We have now found a method whereby aromatic entry into a terpene molecule can be accomplished.

Whereas the terpene polymers obtained in accordance with the processes of the prior art are viscous masses, the alkylate products obtained in accordance with the process of the present invention are light oils.

We have discovered that by adding a terpene slowly to toluene in the presence of an aluminum halide alkylation catalyst, aromatic entry (alkylation) is effected to produce useful and valuable light oils.

Accordingly, it is an object of the present invention to provide a process for effecting the alkylation of aromatic hydrocarbons with terpenes. Another object is to provide a catalytic process for effecting the alkylation of aromatic hydrocarbons with terpenes. An important object is to provide new compositions of matter. A more specific object is to afford a process for alkylating toluene with alpha-pinene.

Other objects and advantages of the present invention will become apparent to those skilled in the art from the following description taken in conjunction with the drawing which shows the distillation curve and the refractive index curve of the product obtained by alkylating toluene with alpha-pinene in accordance with the present invention.

Broadly stated, the present invention provides a process for effecting the alkylation of aromatic hydrocarbons with terpenes to produce valuable synthetic oils, which comprises adding a terpene at a rate falling within well-defined limits, to an aromatic hydrocarbon in the presence of an aluminum halide alkylation catalyst, at temperatures falling within specified limits.

Terpenes are well known organic compounds and may be represented by the general formula $(C_5H_8)_n$, wherein $n$ is equal to one or a whole number greater than one. Alpha pinene, beta pinene and dipentene may be mentioned as non-limiting examples of terpenes suitable for the process of the present invention. In this connection, it must be clearly understood that we may use mixtures of terpenes as well as other mixtures containing one or more of such terpenes, such as wood or gum turpentine. Similarly, we may use aromatic hydrocarbons per se or mixtures containing the same. For example, we may use a close-boiling cut containing toluene mixed with cycloparaffinic hydrocarbons obtained by the distillation of a product of catalytic cracking of higher boiling hydrocarbons, or of a product of catalytic reforming of gasoline.

In general, any aromatic hydrocarbon which is ordinarily alkylatable with the well known alkylating agents of the prior art may be utilized in our process. Benzene, toluene, ethylbenzene, propylbenzene, isopropylbenzene, n-butylbenzene, s-butylbenzene, o-xylene, p-xylene, 1-methyl-2-ethylbenzene, naphthalene, 1-methylnaphthalene and 2-methylnaphthalene may be mentioned by way of non-limiting examples.

The proportions of reactants, i. e., the ultimate amount of terpene to be added slowly to a given amount of aromatic hydrocarbon, used in our process may be varied over a wide range with little effect on the type of product obtained. In general, the charge of reactants may contain ultimately as much as 50 mol per cent of terpenes. In practice, however, we use charges containing ultimately between about 10 mol per cent and about 30 mol per cent of terpenes, and ordinarily, we prefer to use the aromatic hydrocarbon reactant in molar excess over the terpene reactant in view of the fact that in our process, the aromatic hydrocarbon functions as a diluent as well as a reactant.

The catalysts to be used to effect the alkylation of aromatic hydrocarbons with terpenes are aluminum halide alkylation catalysts such as those comprising anhydrous aluminum chloride and aluminum bromide. These materials are well known in the art as alkylation catalysts. For reasons of economy, we prefer to use aluminum chloride. Ordinarily, we employ the catalyst in amounts varying between about 2% and about 10% based on the weight of the terpene reactant. In practice, the catalyst may be added initially to the aromatic hydrocarbon reactant or may be added to the reactor during the course of the reaction.

In accordance with the present invention, in order to achieve alkylation, the rate at which the terpene reactant is added to the aromatic hydrocarbon reactant must fall within well-defined limits. We have found that the rate of addition must be below about 3.0 grams per minute per mol of aromatic hydrocarbon reactant and, preferably, between about 0.05 gram per minute per mol of aromatic hydrocarbon reactant and 0.25 gram per minute per mol of aromatic hydrocarbon reactant. This is illustrated by the following runs in which mixtures of toluene and alpha-pinene, dipentene or turpentine were added with constant stirring, to mixtures of toluene and aluminum chloride kept at reaction temperatures, with periodic additions of additional amounts of aluminum chloride. The final reaction mixtures were stirred for an additional 30 minutes after addition thereto of methanol. The hydrocarbon layer was then separated, washed, neutralized, dried, and subjected to distillation in an efficient column. The pertinent data of each run is set forth in Table I.

TABLE I

| Run No. | Toluene Charged, Grams | Alpha-Pinene Charged, Grams | AlCl₃ Charged, Grams | Temperature, °C. | Rate of Addition of Terpene to Aromatic Hydrocarbon, Gms./min. | Distillation | |
|---|---|---|---|---|---|---|---|
| | | | | | | <120° C.; Grams | Wt. Percent of Toluene (Recovered) |
| 1 | 184 | 75 | 5 | 110-118 | 0.34 | 111 | 60 |
| 2 | 736 | 272 | 20 | 110-113 | 0.41 | 474 | 64 |
| 3 | 736 | 272 | 20 | 110-117 | 0.45 | 570 | 77 |
| 4 | 1,104 | 408 | 30 | 110 | 3.64 | 908 | 82 |
| 5 | 736 | 272 | 5 | 115-118 | 4.2 | 684 | 93 |
| | | Turpentine | | | | | |
| 6 | 184 | 68 | 5 | 100-103 | 0.35 | 136 | 74 |
| 7 | 184 | 68 | 5 | 100-105 | 0.44 | 159 | 86 |
| 8 | 368 | 136 | 12.5 | 90 | 3.68 | 337.6 | 92 |

The boiling point of toluene is 110.5° C. while alpha-pinene boils at a temperature appreciably above 120° C. (155-156° C.). Therefore, when the reaction mixture obtained from the reaction between toluene and alpha-pinene is subjected to distillation, the amount of material distilled at temperatures below 120° C. (<120° C.) is a measure of the degree of reaction achieved. As shown by the data set forth in Table I, the amount of material distilled at temperatures below 120° C., increases as the rate of addition of alpha-pinene increases. This indicates that as the rate of addition of the terpene reactant increases, the degree of alkylation decreases until substantially no alkylation occurs.

The temperatures to be used in our process should vary between about 40° C. and about 140° C., and preferably, between about 100° C. and about 120° C. This is illustrated by the following runs in which mixtures of toluene and alpha-pinene were added with constant stirring, to mixtures of toluene and aluminum chloride kept at reaction temperatures, with periodic additions of additional amounts of aluminum chloride. The final reaction mixtures were stirred for an additional 30 minutes after addition thereto of methanol. The hydrocarbon layer was then separated, washed, neutralized, dried, and subjected to distillation in an efficient column. The pertinent data of each run is set forth in Table II.

TABLE II

| Run No. | Toluene Charged, Grams | Alpha-Pinene Charged, Grams | AlCl₃ Charged, Grams | Temperature, °C. | Rate of Addition of Terpene to Toluene Gms./min. | Distillation | |
|---|---|---|---|---|---|---|---|
| | | | | | | <120 °C.; Grams | Wt. Percent of Toluene (Recovered) |
| 9 | 184 | 68 | 5 | 50 | 0.36 | 136 | 74 |
| 2 | 736 | 272 | 20 | 110–113 | 0.41 | 474 | 64 |
| 10 | 552 | 204 | 15 | 140 | 0.46 | 471 | 85 |

It will be noted that as the temperature of reaction falls below the optimum range of 100–120° C., recovery of toluene increases, indicating that alkylation decreases. Likewise, as the temperature increases above the optimum range of 100–120° C., recovery of toluene also increases, indicating that alkylation decreases.

The process of the present invention may be carried out as a batch, continuous or semi-continuous type of operation. For efficient operation, whether the process is carried out on a batch, or continuous basis, it is essential that the reactants be intimately contacted with one another. This may be accomplished in several ways, by agitation of the reactants, or by adding the terpene at a plurality of points, for example, and in apparatuses which are well known in the art.

The following detailed examples are for the purpose of illustrating the process of our invention, it being clearly understood that the invention is not to be considered as limited to the specific terpene and aromatic hydrocarbon reactants disclosed hereinafter or to the manipulations and conditions set forth therein. As it will be apparent to those skilled in the art, a wide variety of other terpene reactants may be used.

*Example 1*

92 grams of toluene and 5 grams of anhydrous aluminum chloride were placed in a reactor and a mixture of 68 grams of turpentine and 92 grams of toluene was added. The rate of addition of turpentine was 0.44 gram per minute. Rapid agitation of the mixture in the reactor was maintained through the addition of the turpentine and this was continued for 30 minutes after the addition was completed. The mixture in the reactor was kept at a temperature of 100–105° C. throughout. Water was then added with stirring. After the addition of water, the stirring was stopped, and a hydrocarbon layer permitted to separate. The latter was collected, washed, dried and subjected to distillation with the following results:

| | Grams |
|---|---|
| Boiling below 130° C. | 159 |
| Boiling above 130° C. | 97 |
| Distillation loss | 2 |
| Total | 258 |

That toluene entered in the reaction is evidenced by the fact that although 68 grams of turpentine were charged, 97 grams of material boiling above 130° C. were obtained, and that although 184 grams of toluene were charged, 159 grams of material boiling below 130° C. were recovered.

*Example 2*

368 grams of toluene and 5 grams of anhydrous aluminum chloride were placed in a reactor and a mixture of 368 grams of toluene and 272 grams of alpha-pinene was added at a rate of 0.40 gram of alpha-pinene per minute. When 68 grams of alpha-pinene had been added, 5 additional grams of anhydrous aluminum chloride were added. When 136 grams of alpha-pinene had been added, 5 additional grams of anhydrous aluminum chloride were added. Finally, when 204 grams of alpha-pinene had been added, 5 additional grams of anhydrous aluminum chloride were added. Therefore, the total amount of anhydrous aluminum chloride used was 20 grams. Rapid agitation of the mixture in the reactor was maintained throughout the addition of the turpentine and this was continued for 30 minutes after the addition was completed. The mixture in the reactor was kept at a temperature of 110–118° C. throughout. 100 c. c. of methanol were then added to the reaction mixture and the whole stirred for another 30 minutes. The hydrocarbon layer was then permitted to separate. The latter was collected, washed, neutralized, dried and subjected to distillation with the following results:

| Pressure | Temperature | Weight of Fraction |
|---|---|---|
| | °C. | Grams |
| Atmosphere | 109–111.5 | 414 |
| Do | 111.5–117 | 156 |
| Total | | 570 |
| 5 mm | 45–70 | 63 |
| 4 mm | 70–110 | 0 |
| 4 mm | 110–150 | 158 |
| 4 mm | 150–205 | 60 |
| Residue | | 109 |
| Total | | 390 |
| Distillation Loss | | 2 |
| Grand Total | | 962 |

That toluene entered in the reaction is evidenced by the fact that although 272 grams of material boiling above the boiling point of toluene, i. e., alpha-pinene, were charged, 390 grams of material boiling above the boiling point of toluene were obtained, and that although 736 grams of toluene were charged, 570 grams of material boiling below 120° C. were recovered.

*Example 3*

The run set forth in Example 2 was repeated, except that the 272 grams of alpha-pinene were replaced with 272 grams of dipentene and that the latter was added at a rate of 0.37 gram per minute. The results of the distillation were as follows:

| | Grams |
|---|---|
| Boiling below 120° C | 544 |
| Boiling above 120° C | 401 |

That toluene entered in the reaction is evidenced by the fact that although 272 grams of material boiling above the boiling point of toluene, i. e., dipentene, were charged, 401 grams of material boiling above the boiling point of toluene were obtained, and that although 736 grams of toluene were charged, 544 grams of material boiling below 120° C. were recovered.

The compounds obtained by the alkylation of aromatic hydrocarbons with terpenes are useful as intermediates in organic syntheses.

The compound produced by the alkylation of toluene with alpha-pinene is pinyl toluene. The latter is useful in the preparation of additives for lubricating oils and was identified through the following procedure:

Material boiling above 120° C. obtained in accordance with the run set forth in Example 2, was subjected to a redistillation in a column 80 cm. high provided with alternate disk packing. The results obtained are set forth in Table III.

TABLE III

| Fraction No. | Temperature in °C. at 6 mm. of Mercury | Cumulative Volume in c. c. | Refractive Index ($n_d^{20}$) |
|---|---|---|---|
| 1 | below 126.4 | 30 | |
| 2 | up to 157 | 81 | |
| 3 | 161.5 | 131 | 1.5217 |
| 4 | 159 | 145 | 1.5220 |
| 5 | 166.5 | 195 | 1.5217 |
| 6 | 168.5 | 295 | 1.5219 |
| 7 | 168 | 397 | 1.5217 |
| 8 | 167 | 512 | 1.5213 |
| 9 | 169 | 617 | 1.5205 |
| 10 | 170 | 662 | 1.5200 |
| 11 | 174 | 698 | 1.5196 |
| 12 | 175 | 751 | 1.5188 |
| 13 | 177 | 824 | 1.5182 |
| 14 | 185 | 861 | 1.5176 |
| 15 | 185 | 896 | 1.5180 |
| 16 | 189 | 925 | 1.5190 |
| 17 | 198 | 946 | 1.5207 |
| 18 | 202.5 | 966 | |
| 19 | 205 | 984 | |
| 20 | 215 | 1,004 | |

Fractions 3 through 15 were recombined and the following physical properties were determined:

TABLE IV

Kinematic viscosity at 100° F.=12.24 centistokes
Kinematic viscosity at 210° F.=2.38 centistokes
Viscosity index=−44
Specific gravity (20/4)=0.9466
Color saybolt=1.5 (light yellow)
Bromine number, Norwood=29.1–30.7
Refractive index:
   20° C., D=1.5204
   20° C., F=1.52942
   20° C., C=1.51668

Specific Dispersion $\left(\frac{n_F - n_C \times 10^4}{d}\right) = 134.6$

Aniline point=16.2° C.
Molecular weight:
   Ebullioscopic=215–247
   Cryoscopic=228±4

Specific Refractivity $\frac{n^2-1}{n^2+2} \times \frac{1}{d} \times 10^3 = 322$ Boiling point at 6 mm.=160–185° C.
Molecular volume at 20° C., (Mol. wt.=228)=240 c. c.

The boiling point curve and the index of refraction curves shown in the drawing indicated the presence of two compounds. One of them has a boiling point of about 165° C. at 6 mm. and a refractive index ($n_d^{20}$) of about 1.5220. The other has a boiling point of about 180° C. and a refractive index ($n_d^{21}$) of below about 1.5176.

The compounds formed by alkylating one mole of toluene with one mole of alpha-pinene would have the formula: $C_{17}H_{24}$, and a molecular weight of 228.4.

The determined molecular weights set forth in Table IV are consistent with the molecular weight of compounds having the formula: $C^{17}H^{24}$.

The boiling point of 160–185° C. at 6 mm. set forth in Table IV is consistent with those of compounds having 17 carbon atoms, (See Doss, Physical Constants of the Principal Hydrocarbons, The Texas Company, 1943).

The observed aniline point of 16.2° C. set forth in Table IV is consistent with those of compounds having one aromatic ring per molecule, (See Rossini, Hydrocarbons in the Lubricant Fraction of Petroleum, A. P. I., 1938). Further, the aniline point is so sensitive to structure as to fix the compound as a benzene derivative and not a naphthalene derivative and not solely a cyclohexane or dicyclohexane derivative. The latter is confirmed by the value determined for the specific dispersion, 134.6.

The value obtained for specific refractivity: 322, set forth in Table IV, indicates that the compounds are not compounds containing solely a benzene ring and one or more aliphatic chains, but containing also one or more cycloparaffin or cycloolefin rings.

The value obtained for the molecular volume: 240 c. c., set forth in Table IV, is consistent with that of a 17-carbon atom compound containing an aromatic ring and a cyclohexane ring.

Finally, the value obtained for bromine number: 29.1–30.7 (grams of bromine per 100-gram sample), is consistent with that of a compound having a molecular weight of 228 and 0.4–0.5 double bonds per molecule. A compound having a molecular weight of 228 and one double bond per molecule would have a calculated bromine number of 70, while a compound having a molecular weight of 228 and no double bond would have a bromine number of zero. This is considered to be further evidence in support of the conclusion gained from the boiling point and index of refraction curves, namely, the presence of two compounds, one of them saturated, the other, unsaturated.

In view of the foregoing, in the alkylation of toluene with alpha-pinene, the reaction may be postulated to proceed as follows:

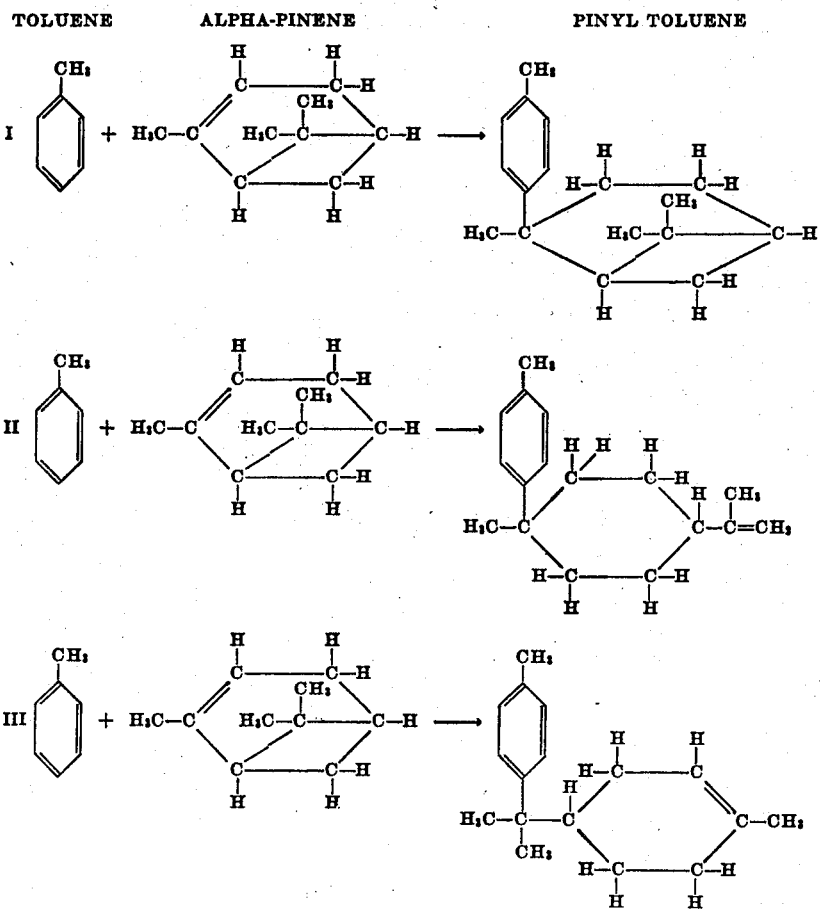

The compounds obtained in accordance with the three postulated reactions have the following physical properties:

TABLE V

|  | I | II | III |
| --- | --- | --- | --- |
| Molecular Weight | 228 | 228 | 228 |
| Specific Dispersion | 140 | 140 | 140 |
| Aniline Point | 8 | 8 | 8 |
| Molecular Volume | 236 | 246 | 246 |
| Bromine Number | 0 | 70 | 70 |

With the exception of the value for bromine number, the physical properties of each of the compounds obtained in accordance with the three postulated reactions are consistent with those set forth in Table IV. The value determined for the bromine number set forth in Table IV, i. e., 29.1–30.7, can be obtained by a mixture of the compound obtained in accordance with reaction I and either of the compounds obtained in accordance with reactions II or III.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. A process for effecting the condensation of an aromatic hydrocarbon with a terpene, which comprises adding a terpene to an aromatic hydrocarbon at a rate of less than about 3 grams per minute per mol of aromatic hydrocarbon to produce a mixture, continuing adding the terpene to said mixture at said rate until said mixture ultimately contains about 50 mol per cent of terpene, in the presence of an aluminum halide alkylation catalyst, and at temperatures varying between about 40° C. and about 140° C.

2. A process for effecting the condensation of an aromatic hydrocarbon with a terpene, which comprises adding a terpene to an aromatic hydrocarbon at a rate of less than about 3 grams per minute per mol of aromatic hydrocarbon to produce a mixture, continuing adding the terpene to said mixture at said rate until said mixture ultimately contains between about 10 mol per cent and about 30 mol per cent of terpene, in the presence of an aluminum halide alkylation catalyst, and at temperatures varying between about 100° C. and about 120° C.

3. A process for effecting the condensation of an aromatic hydrocarbon with a terpene, which comprises adding a terpene to an aromatic hydrocarbon at a rate varying between about 0.05 gram per minute per mol of aromatic hydrocarbon and about 0.25 gram per minute per mol of aromatic hydrocarbon to produce a mixture, continuing adding the terpene to said mixture at said rate until said mixture ultimately contains about 50 mol per cent of terpene, in the presence of an aluminum chloride alkylation catalyst, and at temperatures varying between about 40° C. and about 140° C.

4. A process for effecting the condensation of an aromatic hydrocarbon with a terpene, which comprises adding a terpene to an aromatic hydrocarbon at a rate varying between about 0.05 gram per minute per mol of aromatic hydrocarbon and about 0.25 gram per minute per mol of aromatic hydrocarbon to produce a mixture, continuing adding the terpene to said mixture at said rate until said mixture ultimately contains between about 10 mol per cent and about 30 mol per cent of terpene, in the presence of an aluminum chloride alkylation catalyst, and at temperatures varying between about 100° C. and about 120° C.

5. A process for effecting the condensation of toluene with alpha-pinene, which comprises adding alpha-pinene to toluene at a rate of less than about 3 grams per minute per mol of toluene to produce a mixture, continuing adding alpha-pinene to said mixture at said rate until said mixture ultimately contains about 50 mol per cent of alpha-pinene, in the presence of an aluminum chloride alkylation catalyst, and at temperatures varying between about 40° C. and about 140° C.

6. A process for effecting the condensation of toluene with alpha-pinene, which comprises adding alpha-pinene to toluene, at a rate varying between about 0.05 gram per minute per mol of toluene and about 0.25 gram per minute per mol of toluene to produce a mixture, continuing adding alpha-pinene to said mixture at said rate until said mixture ultimately contains between about 10 mol per cent and about 30 mol per cent of alpha-pinene, in the presence of an aluminum chloride alkylation catalyst, and at temperatures varying between about 100° C. and about 120° C.

7. A process for condensing toluene with a terpene, which comprises adding turpentine to toluene at a rate of less than about 3 grams per minute per mol of toluene to produce a mixture, continuing adding turpentine to said mixture at said rate until said mixture ultimately contains about 50 mol per cent of turpentine, in the presence of an aluminum chloride alkylation catalyst, and at temperatures varying between about 40° C. and about 140° C.

8. A process for condensing toluene with a terpene, which comprises adding turpentine to toluene at a rate varying between about 0.05 gram per minute per mol of toluene and about 0.25 gram per minute per mol of toluene to produce a mixture, continuing adding turpentine to said mixture at said rate until said mixture ultimately contains between about 10 mol per cent and about 30 mol per cent of turpentine, in the presence of an aluminum chloride alkylation catalyst, and at temperatures varying between about 100° C. and about 120° C.

9. A process for condensing toluene with dipentene, which comprises adding dipentene to toluene at a rate varying between about 0.05 gram per minute per mol of toluene and about 0.25 gram per minute per mol of toluene to produce a mixture, continuing adding dipentene to said mixture at said rate until said mixture ultimately contains about 50 mol per cent of dipentene, in the presence of an aluminum chloride alkylation catalyst, and at temperatures varying between about 40° C. and about 140° C.

10. A process for condensing toluene with dipentene, which comprises adding dipentene to toluene at a rate of less than about 3 grams per minute per mol of toluene to produce a mixture, continuing adding dipentene to said mixture at said rate until said mixture ultimately contains between about 10 mol per cent and about 30 mol per cent of dipentene, in the presence of an aluminum chloride alkylation catalyst, and at temperatures varying between about 100° C. and about 120° C.

GEORGE C. JOHNSON.
JOHN KELLETT, III.

REFERENCES CITED

The following references are of record in the file of this patent:

UNITED STATES PATENTS

| Number | Name | Date |
|---|---|---|
| 1,939,932 | Thomas | Dec. 19, 1933 |
| 2,159,220 | McNulty et al. | May 23, 1939 |

OTHER REFERENCES

Groll: "Vapor phase cracking," Ind. Eng. Chem. (July 1933), pages 784–797 (13 pages). pages 789, 790, 791 are especially pertinent.